Nov. 22, 1949  H. B. PRINTZ  2,488,739
SHOCK RESPONSIVE SWITCH AND VALVE CONTROL
Filed March 31, 1947

Inventor
HENRY B. PRINTZ.
By Howard J. Whelan.
Attorney

Patented Nov. 22, 1949

2,488,739

UNITED STATES PATENT OFFICE 2,488,739

SHOCK RESPONSIVE SWITCH AND VALVE CONTROL

Henry B. Printz, Baltimore, Md.

Application March 31, 1947, Serial No. 738,409

6 Claims. (Cl. 200—53)

This invention refers to safety devices and more particularly to mechanical and electrical devices usable for the automatic shutting off of the current or ignition and fuel on a motor vehicle in an emergency.

It is an object of this invention to provide a new and improved disconnector for fuel and ignition for vehicles using internal combustion motors that will avoid one or more of the disadvantages and limitations of the prior art.

Another object of this invention is to provide a new and improved disconnector unit for fuel or ignition for a motor vehicle that will automatically operate when the vehicle is given a sudden severe shock, such as would arise in a collision with the ground or another vehicle, or object, on the ground, in the air, or in the water, and thereby reduce the hazard of explosion or fire.

A further object of the present invention is to provide a new and improved disconnector unit for fuel or ignition for motor vehicles travelling on the ground, or in the air or water, that will operate readily in an emergency without breaking the device and may be operably replaceable or reset in a very effective and facile manner.

An additional object of this invention is to provide a new and improved disconnector unit for the ignition of a motor vehicle that will operate in all directions due to the emergency, and whose structure will be relatively simple, compact and inexpensive.

Other objects will become apparent as the invention is more fully set forth.

For a clearer understanding of the invention and its objects reference is made to the drawings appended and the description that follows, wherein a particular form of the invention is used as an illustration and to indicate the principles thereof, while the scope of the invention is emphasized in the claims.

In the drawings.

Similar reference numerals pertain to the same parts throughout the drawings.

Figure 1:
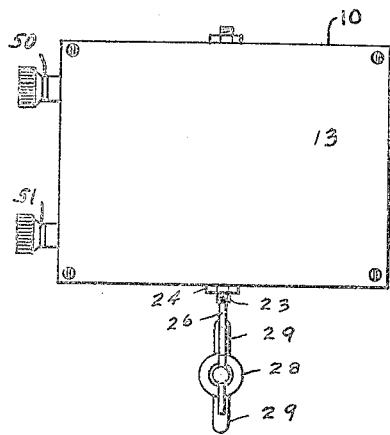
Figure 1 is a plan view of a safety device embodying this invention.
Figure 2:
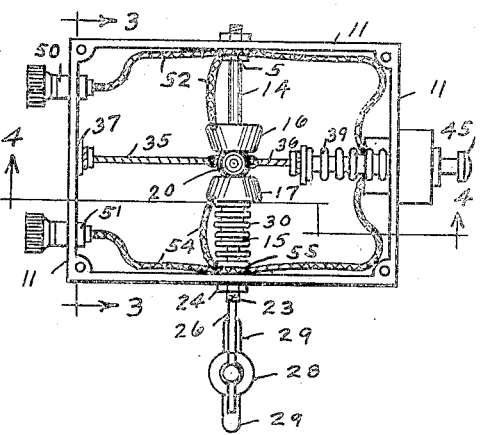
Figure 2 is a view similar to Figure 1, with the cover removed.
Figure 3:
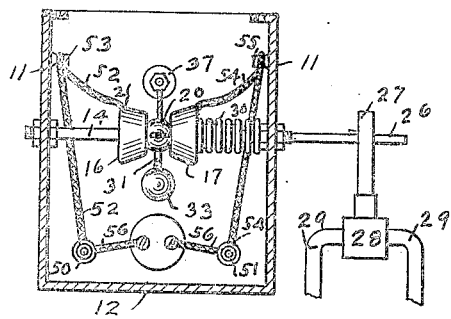
Figure 3 is a sectional view taken along lines 3—3 of Fig. 2.
Figure 5:
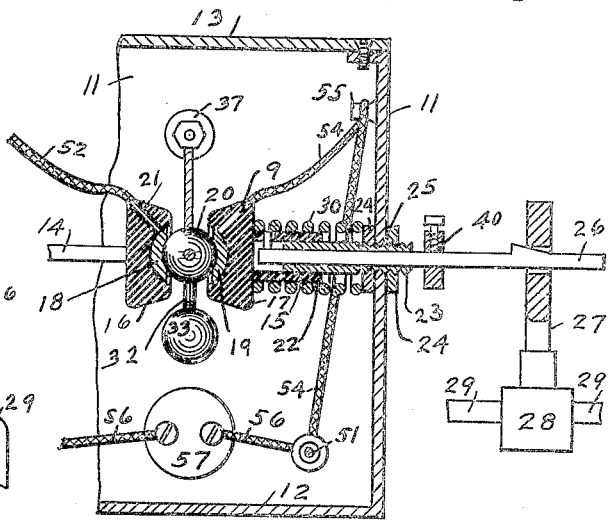
Figure 5 is an enlarged sectional view similar to Fig. 3, with the top in position.
Figure 4:
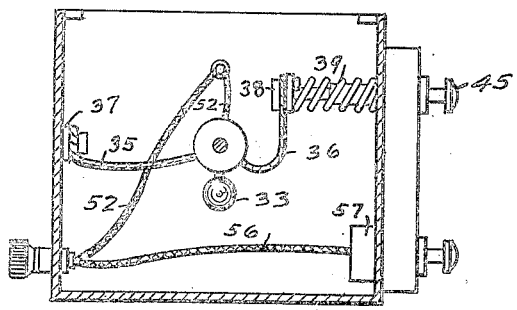
Figure 4 is a sectional view taken along line 4—4 of Fig. 2.

Referring to the construction shown in the drawings, a disconnector unit consists of a housing 10 having four walls, 11, a bottom 12 and a door 13 to permit access thereto. Centrally arranged on two opposite walls are two holders 14 and 15 respectively terminated at their adjacent end portions with contactor saddles 16 and 17. These saddles are symmetrical to one another with their inner conducting facing surfaces 18 and 19 respectively, spherically contoured to hold a metal ball 20 in between them and close an electrical circuit therethrough. The conducting elements or shells 18 and 19 are each set in insulating saddles forming the exterior of the shells and attached to conducting stems 21 and 9 respectively. The stem 21 is attached to the insulating saddle which is rigidly fastened to its holder 14, in a horizontal position across the housing interior. The stem 9 is fastened to the element 19 and its saddle holding the latter. A stem 22 is of hollow tubing and reciprocates on another tubing 23 which forms the rigid structure of the holder 15, and is adjustable in and out of the housing 10 through a hole 25 in the wall 11, by means of nuts 24 screwing on its periphery and tightening it to the wall 11, in different positions as shown. The stem 22 is attached to and reciprocates a solid plunger 26 operating in the tubing 23 and moves with it. On the end portion of the plunger 26, exterior to the housing, the plunger is connected with a link 27 suitably attached to a fuel valve 28 on a feed pipe 29 and controlling the flow of fuel to the vehicle which the unit is assembled on. The stem 22 is kept resiliently tensioned by a coil spring 30 which tends to press it towards the middle of the housing 10. A limit collar 40 on the plunger 26 prevents the conducting element 19 from going into the housing too far and contacting the element 18, when it strikes the wall of the tubing 23. The metal ball 20 ordinarily keeps the elements 18 and 19 electrically coupled, when it is pressed between them. Should it be removed from between the elements, the separation between the latter would cause them to be electrically disconnected. This ball 20 has a pin 32 extended from it on the bottom of which is another ball 33 that is relatively heavy, but not abnormally large. The pin 32 that holds it is preferably adjustable into the ball 20, and is placed so as not to interfere with the operation of the ball 20 in any way. The saddles are bevelled to permit an easy insertion of the ball 20 into them, so as to be held clamped between them. The ball 20 is attached by two loose very flexible chains 35 and 36 to opposite sides. One chain 35 is attached to a bracket 37 attached to the wall of the housing at a slightly higher level than that of the center of saddles and holders 14 and 15. The other chain 36 is on a level above the saddles and holders 14 and 15, and is fastened to the end portion of a shank 38 resiliently held by a spring 39 in the wall opposite that to which the chain 35 is connected. A handle 45 serves to facilitate the pulling of the shank and for limiting its movement into the housing under the tension of the spring 39. When the ball 20 is out of the saddles it is supported by the chains 35 and 36 below them. It can be pulled upwards into the saddles by pulling on the handle 45. This pulls on its chain 36 and with the resistive guiding action of the chain 35 brings it into and aligned with the space between the saddles and enables it to be set in between them.

The operation of the unit is as follows: Assuming it is used in an aeroplane. Should the aeroplane take a nose-dive and strike the earth, the inertia of the balls 20 and 33 will induce them to stress against the sides of the saddles of the holders and pass out between them by reason of the sudden stoppage of the plane. This will disconnect the circuit and the ignition will be turned off. At the same time, the movement of the plunger when the ball 29 allows it to press inwardly, moves the link 27 and throws the valve 28 thereby shutting off the fuel line. It matters not which direction the aeroplane hits the ground, the balls 20 and 33 will move away from the saddles. In some cases the direction will be such that the ball 33 will revolve about the ball 20 as a center and bring the pin 32 against the edge of the saddle. The leverage of the pin exerted by the ball 33 and the saddle edge as a fulcrum will force the ball 20 out and allow it to drop to the point below the conducting elements 18 and 19 where it is suspended on the chains. The resistance induced by the saddles and spring 39 is sufficient to withstand the ordinary movement of the aeroplane, including rolls, etc., but not sufficient to withstand the effect of a collision. In such a case as collision, it is very important that the ignition and fuel be disconnected to reduce the danger of fire or explosion which would occur otherwise. The replacement of the ball 20 is between the saddles has already been explained. The use of the ball 20 to open and close the circuit avoids the use of fuses and other devices that would be so damaged after each use that they would have to be removed and replaced by new ones. This invention permits the use and reuse of the devices an indefinite number of occasions.

It is understood in this specification that the term housing is comprehensive enough to include any suitable framework for the support of the various parts of the structure. Also that the chains, may be in the form of cables or other flexible attachment to the ball 20 or weight as it may be termed. The force sufficient to detach the weight from the holder or its saddle is dependent on the velocity of the weight and has to be above a predetermined value in order to make it great enough to be pulled through the inertia from the saddle. Or the total weight of the balls 20 and 33 must be sufficient for the purpose, where the two are used in the unit. Electrical terminals 50 and 51 are connected to the electrical source on the outside. A feeder 52 is connected to terminal 50 and supported on a holder 53 then connects with conducting stem 21. A feeder 54 connects with terminal 51, and is supported on a holder 55 then connects with conducting stem 9. Cables 56 connect a shunt switch 57 across terminals 50 and 51 when it is desired to by-pass the ball connector 20.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention what is claimed is:

1. A disconnector unit of the class described comprising in combination, a housing, a plurality of holders supported in the housing having concaved surfaces, a ball supportable between said holders, of such size and weight as to be forced out of said holders by inertia when given an abnormal shock, for disconnecting a circuit passing through the holders and ball, means for suspending the ball when so forced out so as to be available for reuse in the holders, means for increasing the inertia effect of the ball attached thereto and bevelled insulating coverings for said holders to prevent the electrical completion of the circuit during said disconnection yet arranged to facilitate the replacement of the ball in the holders for recompletion of the circuit therethrough.

2. A disconnector unit of the class described comprising in combination, a housing, a plurality of holders supported in the housing having concaved surfaces, a ball supportable between said holders between said surfaces in electrical contact therewith, said ball being of such size and weight as to be forced out of said holders by inertia when given an abnormal shock, for disconnecting a circuit passing through the holders and ball, means for suspending the ball when so forced out so as to be available for reuse in the holders, means for increasing the inertia effect of the ball attached thereto, means connecting with the holders for controlling the operation of a fuel valve and an insulating covering over said holders excepting said surfaces and formed so as to facilitate the replacement of the ball by slanting its contour to the surfaces; whereby the ball will be converged thereto to space the surfaces further so they will open up to allow said surfaces to admit the ball therein and encompass it securely.

3. A disconnector unit of the class described mountable in a vehicle comprising in combination, a framework, a weight, a holder mounted on said framework for resiliently and conductively supporting said weight but detachable therefrom by the action of inertia when the vehicle is travelling above a predetermined rate of movement and is brought to a sudden stop, said weight being of conducting material adapted to open a circuit when detached from said holder, means connected with said holder for mechanically operating a valve mechanism in synchronism with the opening of the circuit, means operable in said framework for replacing said weight in the holder, and having resilient means for returning the last mentioned means to its normal position after the replacement whereby it will be inactively attached thereto until operated again and an insulating covering on the holder for preventing electrical short circuiting of the circuit and of the holder to parts other than said weight during its placement therein.

4. A disconnector unit of the class described mountable in a vehicle comprising in combination, a framework, a weight, a holder mounted on said framework for resiliently and conductively supporting said weight but detachable therefrom by the action of inertia when the vehicle is travelling above a predetermined rate of movement and is brought to a sudden stop, said weight being of conducting material adapted to open a circuit when detached from said holder, means connected with said holder for mechanically operating a valve mechanism in synchronism with the opening of the circuit, and means operable in said framework for replacing said weight in the holder, having resilient means for returning the last mentioned means to its normal position after the replacement whereby it will be inactively attached thereto until operated again, said last mentioned resilient means including a coil spring, a stem passing through the framework and tensioned by said spring and flexible cables attached to predetermined portions of the weight to move and guide same to said holder for placement therein and an insulating saddle for the holder to facilitate the holding of the weight and its placement and discharge therein and to prevent electrical contact therewith during the free movement of the weight when detached from the holder.

5. A disconnector unit of the class described mountable in a vehicle comprising in combination, a framework, a weight, a holder mounted on said framework for resiliently and conductively supporting said weight but detachable therefrom by the action of inertia when the vehicle is travelling above a predetermined rate of movement and is brought to a sudden stop, said weight being of conducting material adapted to open a circuit when detached from said holder, means connected with said holder for mechanically operating a valve mechanism in synchronism with the opening or closing of the circuit, means operable in said framework for replacing said weight in the holder, having resilient means for returning the last mentioned means to its normal position after the replacement whereby it will be inactively attached thereto until operated again, said last mentioned resilient means including a coil spring, a stem passing through the framework and tensioned by said spring and flexible cables attached to predetermined portions of the weight to move and guide same to said holder for placement therein, the location of the stem and cables being in planes different from that of the weight and its position in the holder to facilitate its manipulation for said placement and an insulating saddle for the holder to facilitate the holding of the weight and its placement and discharge therein and to prevent electrical contact therewith during the free movement of the weight when detached from the holder.

6. A disconnector unit of the class described mountable in a vehicle comprising in combination, a framework, a weight, a holder mounted on said framework for resiliently and conductively supporting said weight but detachable therefrom by the action of inertia when the vehicle is travelling above a predetermined rate of movement and is brought to a sudden stop, said weight being of conducting material adapted to open a circuit when detached from said holder, means connected with said holder for mechanically operating a valve mechanism in synchronism with the opening or closing of the circuit, means operable in said framework for replacing said weight in the holder, having resilient means for returning the last mentioned means to its normal position after the replacement whereby it will be inactively attached thereto until operated again, said last mentioned resilient means including a coil spring, a stem passing through the framework and tensioned by said spring and flexible cables attached to predetermined portions of the weight to move and guide same to said holder for placement therein, the location of the stem and cables being in planes different from that of the weight and its position in the holder to facilitate its manipulation for said placement, and another weight adjustably connected to the first mentioned weight for facilitating the inertia effect to cause the detachment of the first weight from its holder and an insulating saddle for the holder to facilitate the holding of the weight and its placement and discharge therein and to prevent electrical contact therewith during the free movement of the weight when detached from the holder.

HENRY B. PRINTZ.

REFERENCES CITED

The following references are of record in the file of this patent:

UNITED STATES PATENTS

| Number | Name | Date |
|---|---|---|
| 630,292 | MacKenzie | Aug. 1, 1899 |
| 2,056,494 | Tucker, Jr., et al. | Oct. 6, 1936 |
| 2,223,097 | Ehret | Nov. 26, 1940 |